(12) United States Patent
Pitts et al.

(10) Patent No.: US 8,691,447 B2
(45) Date of Patent: Apr. 8, 2014

(54) HOMOGENEOUS, DUAL LAYER, SOLID STATE, THIN FILM DEPOSITION FOR STRUCTURAL AND/OR ELECTROCHEMICAL CHARACTERISTICS

(75) Inventors: J. Roland Pitts, Lakewood, CO (US); Se-Hee Lee, Louisville, CO (US); C. Edwin Tracy, Golden, CO (US); Wenming Li, Milpitas, CA (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 988 days.

(21) Appl. No.: 12/293,460

(22) PCT Filed: Feb. 25, 2008

(86) PCT No.: PCT/US2008/054894
§ 371 (c)(1),
(2), (4) Date: Sep. 18, 2008

(87) PCT Pub. No.: WO2009/108184
PCT Pub. Date: Sep. 3, 2009

(65) Prior Publication Data
US 2010/0261067 A1    Oct. 14, 2010

(51) Int. Cl.
*H01M 10/0562* (2010.01)
*H01M 10/0561* (2010.01)
*H01M 10/0565* (2010.01)

(52) U.S. Cl.
CPC ...... *H01M 10/0562* (2013.01); *H01M 10/0561* (2013.01); *H01M 10/0565* (2013.01); *Y02E 60/122* (2013.01)
USPC ........ 429/304; 429/223; 429/224; 429/231.3; 429/231.7; 429/231.95

(58) Field of Classification Search
CPC ............ Y02E 60/122; H01M 10/0561; H01M 10/0562; H01M 10/0565
USPC ................... 429/304, 322, 223, 231.3, 231.7, 429/231.95, 224
See application file for complete search history.

(56) References Cited

U.S. PATENT DOCUMENTS

| 4,508,430 A | 4/1985 | Freller et al. |
| 5,648,187 A | 7/1997 | Skotheim |

(Continued)

FOREIGN PATENT DOCUMENTS

| EP | 2093824 | 8/2009 |
| KR | 1020010072575 A | 7/2001 |
| WO | 2008153564 | 12/2008 |

OTHER PUBLICATIONS

International Search Report and Written Opinion of the International Searching Authority dated Jan. 6, 2009, for International Application No. PCT/US2008/054894.

(Continued)

*Primary Examiner* — Patrick Ryan
*Assistant Examiner* — Ben Lewis
(74) *Attorney, Agent, or Firm* — W. LaNelle Owens; John C. Stolpa

(57) ABSTRACT

Solid state, thin film, electrochemical devices (10) and methods of making the same are disclosed. An exemplary device 10 includes at least one electrode (14) and an electrolyte (16) deposited on the electrode (14). The electrolyte (16) includes at least two homogenous layers of discrete physical properties. The two homogenous layers comprise a first dense layer (15) and a second porous layer (16).

20 Claims, 4 Drawing Sheets

(56) References Cited

U.S. PATENT DOCUMENTS

| | | | |
|---|---|---|---|
| 5,930,108 | A | 7/1999 | Kurzweil et al. |
| 6,753,114 | B2 | 6/2004 | Jacobs et al. |
| 6,805,999 | B2 | 10/2004 | Lee et al. |
| 2004/0023106 | A1* | 2/2004 | Benson et al. ............... 429/122 |
| 2004/0175626 | A1* | 9/2004 | Dasgupta et al. ............ 429/309 |
| 2007/0015060 | A1 | 1/2007 | Klaassen |
| 2007/0015061 | A1* | 1/2007 | Klaassen ..................... 429/322 |
| 2007/0042225 | A1 | 2/2007 | Seabaugh et al. |
| 2007/0139756 | A1 | 6/2007 | Agrawal et al. |
| 2007/0140072 | A1 | 6/2007 | Agrawal et al. |
| 2007/0143774 | A1 | 6/2007 | Agrawal et al. |
| 2007/0154762 | A1* | 7/2007 | Schucker ....................... 429/33 |
| 2010/0285372 | A1* | 11/2010 | Lee et al. ..................... 429/320 |

OTHER PUBLICATIONS

Extended European Search Report for European Patent Application No. 08780444.9, completed Nov. 18, 2011, pp. 1-7.

International Preliminary Report on Patentability for International (PCT) Application No. PCT/US2008/054894, Issued Aug. 31, 2010, pp. 1-4.

* cited by examiner

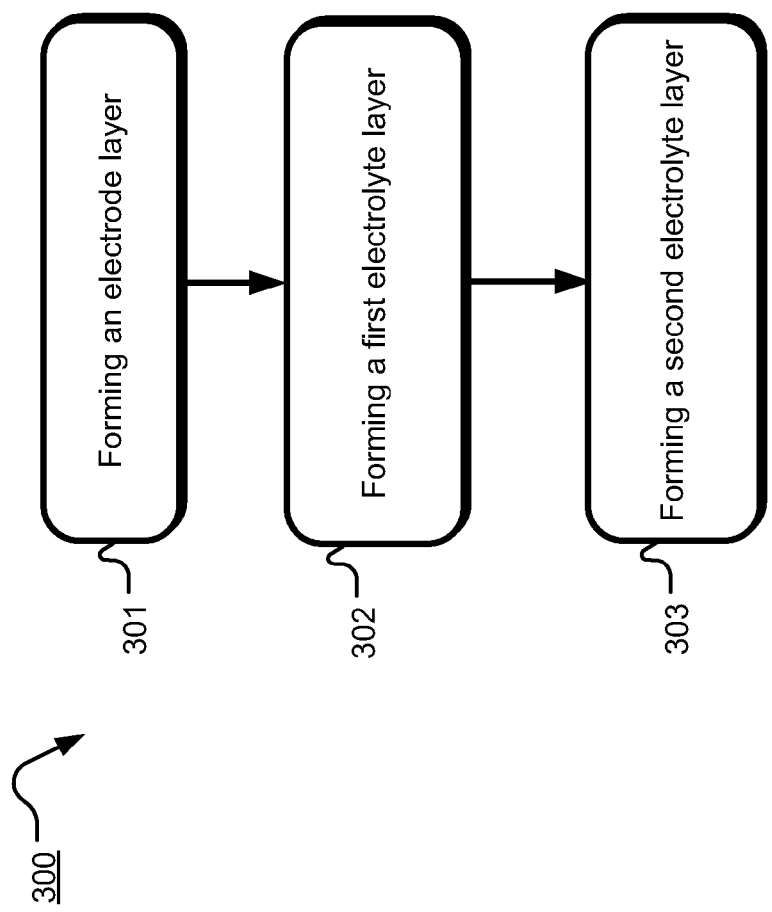

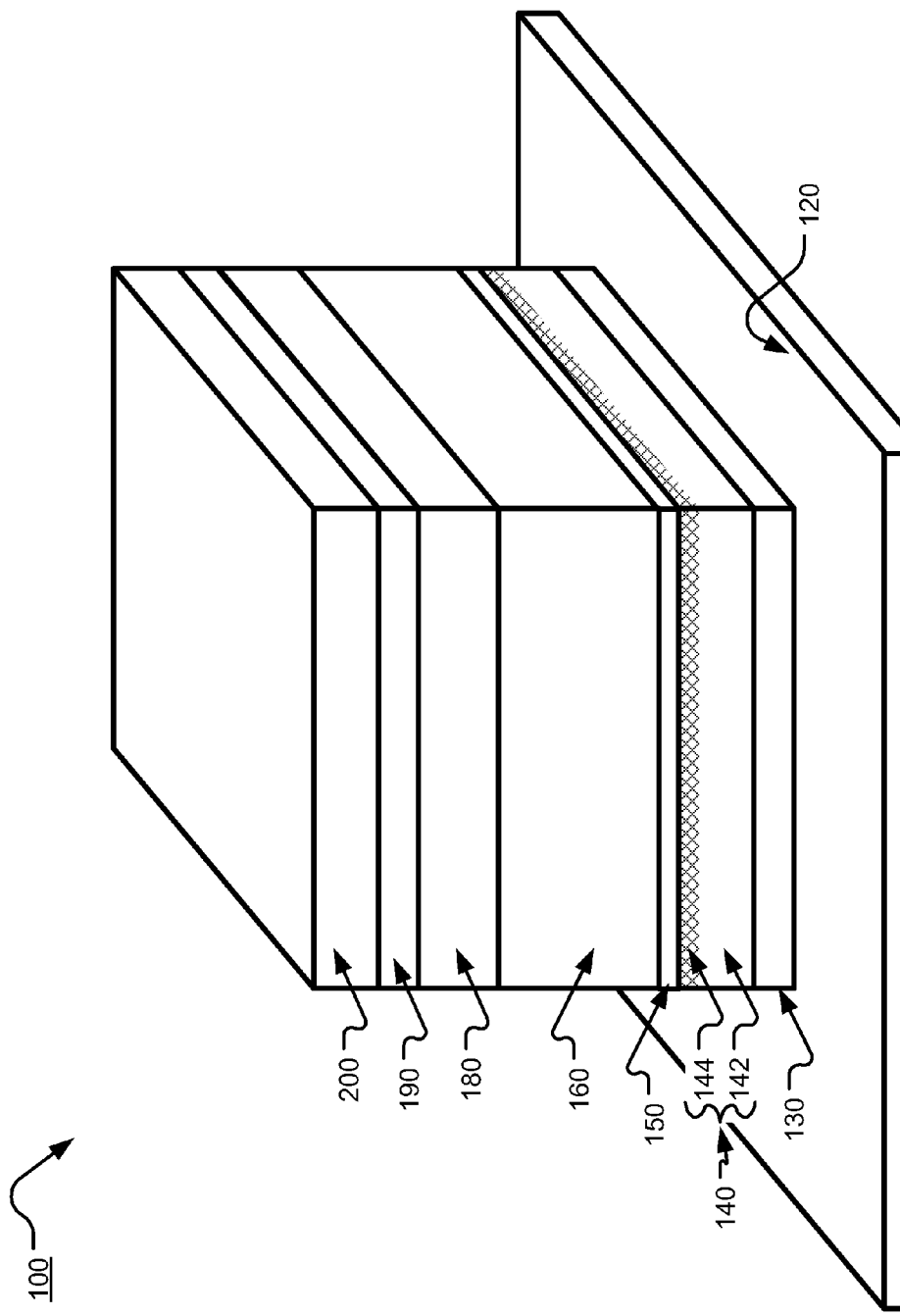

HOMOGENEOUS, DUAL LAYER, SOLID STATE, THIN FILM DEPOSITION FOR STRUCTURAL AND/OR ELECTROCHEMICAL CHARACTERISTICS

CONTRACTUAL ORIGIN

The United States Government has rights in this invention under Contract No. DE-AC36-99GO10337 between the United States Department of Energy and the National Renewable Energy Laboratory, a Division of the Midwest Research Institute.

BACKGROUND

In the field of solid state, thin film electronic devices, a variety of applications make use of materials which provide for ion transport within or between layers. A first example is in thin film batteries for charge storage, such as lithium ion and lithium metal batteries, in which lithium ions move in or through an electrolyte layer disposed between two electrode layers, an anode and a cathode. A further sub-set of applications include electrochromic (EC) devices, which in some cases also use lithium ion transport in an electrolyte layer between a reference electrode layer and a counter electrode layer to effect an optical change in device transition.

In either of such or other similar solid state thin film electronic devices, a variety of complications can be encountered. For example, a number of implementations might involve the use of a first lithium based layer, as for example, either a lithium metal electrode or a lithiated electrode or electrolyte layer, lithiated in the sense of including intercalated $Li^+$ ions within the layer. However, the lithium in such a layer may be relatively volatile or unstable in that exposure of that layer, and thus the Li ions, to air (oxygen, $O_2$, or water vapor, $H_2O$) may allow for the lithium to react with oxygen, which oxidizes the lithium and thereby renders the lithium unavailable for ion transport. The more stable lithium oxide (LiO) produced by such an oxidation reaction does not provide free $Li^+$ ions available for movement and electrochemical action.

Examples where such air exposure could occur may include manufacturing instances where either or both a lithiated electrode layer is exposed to air during a mask change, or when an overlayer is of such a nature, e.g., porous, such that air exposure thereto could allow for oxygen permeation or passage to the underlying lithiated layer. A more specific example may include use of a relatively porous lithium-based electrolyte layer, e.g., a porous lithium aluminum tetrafluoride ($LiAlF_4$) overlayer deposited over a lithiated electrode layer, such as a lithiated nickel oxide (NiO) electrode layer or other lithiated metal oxide layer (lithiated NiO may also be used as a counterelectrode layer in EC devices, inter alia). As may be typical, a mask change may be desired after deposition of the porous electrolyte layer; however, this may thus open the lithiated electrode layer to exposure to oxygen via permeation of the oxygen through the porous electrolyte layer. A more stable, less $Li^+$ ion mobile, LiO—NiO electrode layer may result leaving relatively fewer $Li^+$ ions for effective conduction.

Moreover, even though it may be that a more dense, less porous overlayer may be less permeable to oxygen; the use of a rather porous electrolyte layer can have desirable attributes mechanically and electrically or electrochemically (i.e., better ion conductivity); thus, substitution with a denser, less porous layer simply to avoid air exposure may not be a preferable option. For example, a dense thin lithium-based electrolyte layer, such as lithium aluminum tetrafluoride ($LiAlF_4$) may be used as a deposition layer over a lithiated electrode to avoid oxygen permeation; however, such a dense electrolyte may not be as conductive and/or may not be structurally sound and rather be subject to cracking and thus allow for undesirable electrical shorting therethrough.

Thus, it may be found desirable to provide a thin film solid state device which is protected from lithium ion oxidation and includes one or more of structural and electrical or electrochemical stability.

The foregoing examples of the related art and limitations related thereto are intended to be illustrative and not exclusive. Other limitations of the related art will become apparent to those of skill in the art upon a reading of the present specification and a study of the drawings.

SUMMARY

The following implementations and aspects thereof are described and illustrated in conjunction with systems, tools and methods which are meant to be exemplary and illustrative, not limiting in scope. In various implementations, one or more of the above-described issues have been reduced or eliminated, while other implementations are directed to other improvements.

An exemplary solid state thin film electrochemical device may include at least one electrode; and, an electrolyte deposited on the electrode, the electrolyte including at least two homogenous layers of discrete properties, a first dense layer and a second porous layer.

The foregoing specific aspects and advantages are illustrative of those which can be achieved by these developments and are not intended to be exhaustive or limiting of the possible advantages which can be realized. Thus, those and other aspects and advantages of these developments will be apparent from the description herein or can be learned from practicing the disclosure hereof, both as embodied herein or as modified in view of any variations which may be apparent to those skilled in the art. Thus, in addition to the exemplary aspects and embodiments described above, further aspects and embodiments will become apparent by reference to the drawings and by study of the following descriptions.

BRIEF DESCRIPTION OF THE DRAWINGS

Exemplary implementations are illustrated in referenced figures of the drawings. It is intended that the embodiments and figures disclosed herein are to be considered illustrative rather than limiting. In the drawings:

FIG. 3 is a flow chart of an exemplary method of fabrication; and,

FIG. 4 is a schematic isometric diagram of a further alternative exemplary electronic device.

DETAILED DESCRIPTION

Presented here are exemplary electronic devices and methods of manufacture thereof which involve the use of homogenous dual layers of a material in discrete solid state forms to provide advantages of structural and/or electrical or electrochemical stability as well as protection from oxidation. More particularly, electrical devices such as thin film solid state lithium ion batteries or electrochromic (EC) devices, inter alia, and processes for the fabrication of such devices are described here. The physical properties of the two homogenous layers may be manipulated to provide greatly enhanced physical properties, such as to provide one or more of high ionic conductivity, mechanical fracture toughness, and/or a low diffusion constant for atmospheric gases, or all such properties simultaneously.

Figure 1:
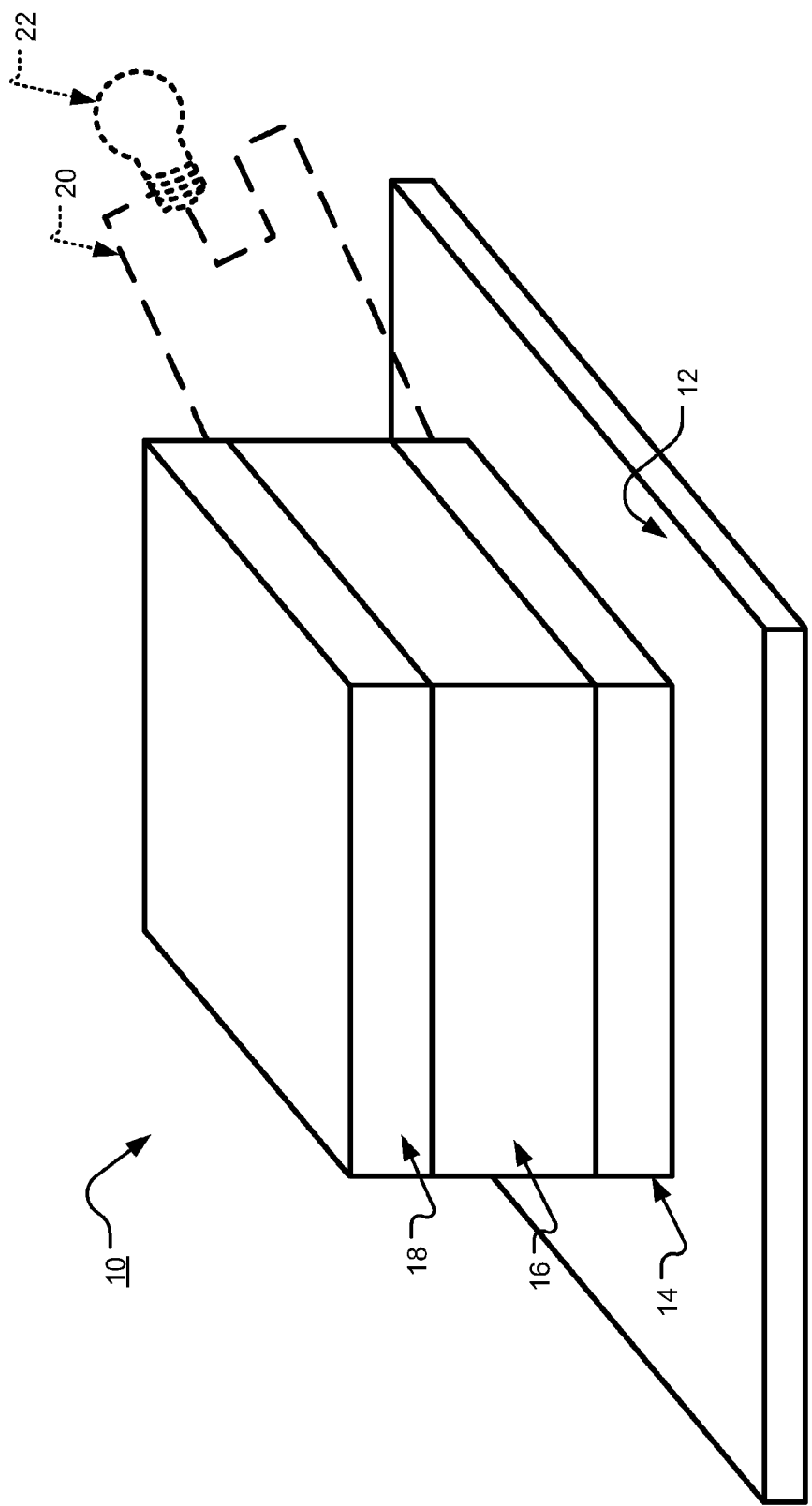
FIG. 1 is a schematic isometric diagram of an exemplary electronic device.

FIG. 1 provides a generalized view of an exemplary thin film electronic device 10 to or for which the developments hereof may be applied or used. More particularly, the electronic device 10 may include a substrate 12 upon which may have been formed a first electrode layer 14 with an electrolyte layer 16 thereon, and a second electrode layer 18 formed thereover. If such a device 10 is a battery, then, the electrodes 14 and 18 may be connected to a circuit 20 to power a load 22; the circuit and load 20, 22 shown in dashed lines to demonstrate the optional and schematic representation thereof. To effect such a connection to a circuit 20, inter alia, some one or more electrically conducting contacts may be used, whether in the form of one or more thin film current collectors (e.g., anode and/or cathode current collectors, not shown) deposited on the substrate and/or an electrode, or through other connections as may be known in the art and which may also be later developed. Electronic device 10 may alternatively be an electrochromic (EC) device and may have a substantially similar basic structure without attachment to such a circuit and load, but rather to a power supply to drive ion transfer and thus optical property changes.

Figure 2:
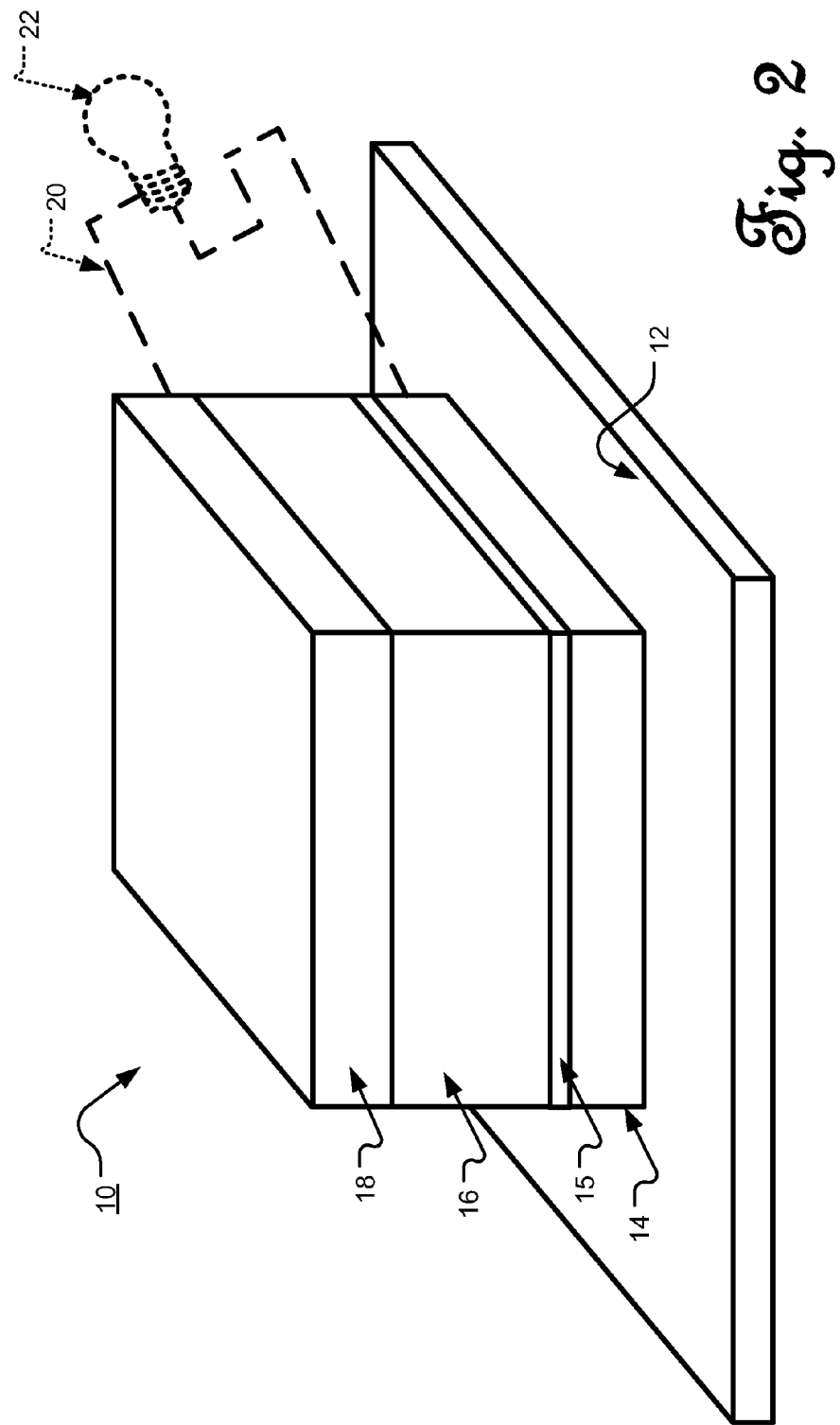
FIG. 2 is a schematic isometric diagram of an alternative exemplary electronic device.

In FIG. 2, a further intermediate layer 15 is shown added within the device 10. According to the developments hereof, the intermediate layer 15 may be of the same homogenous material as the electrolyte 16, though deposited such that it has one or more discrete physical characteristics. In one example, layer 15 is a thin dense layer of a particular selected material compared to a thicker or taller layer 16 of the same material though having, for example, a less dense or even porous nature. Achieving the discrete characteristics may be through the manufacturing process at different temperatures, pressures, speed (deposition rate), concentrations or other discrete atmospheric or other manufacturing conditions. For example, many thin film manufacturing processes occur at high vacuum pressures; however, some materials deposited in high vacuum at one low pressure may form a relatively porous layer, whereas at a still lower pressure (e.g., 100× lower, see description below) may form a more dense, less permeable layer. As shown briefly in FIG. 3, three general steps for a manufacturing process 300 emerge: first step 301, forming an electrode layer, second step 302, forming a first electrolyte layer, and third step 303, forming a second electrolyte layer. Not shown here are the potential other steps, either preparatory to, or subsequently occurring, as in forming a second electrode layer.

In solid state, thin film lithium ion batteries, a large variety of materials are and have been used for the respective electrodes. Commonly, cathodes (positive electrodes that power conventional lithium-ion batteries) have included lithiated metal oxides such as lithium cobalt oxide ($LiCoO_2$), or oxides of other metals such as manganese ($LiMnO_2$ or $LiMn_2O_4$) and nickel (LiNiO) or spinels or composites thereof (e.g., of two or more of cobalt, manganese or nickel), or lithiated metal phosphates such as lithium iron phosphate ($LiFePO_4$). The anode (negative electrode into which the $Li^+$ ions insert during charging of the battery and from which the $Li^+$ ions move or are extracted during discharge of the battery) may be of many materials also; for example, lithium metal used in some cases, graphite, certain metal oxides, or other carbon based forms in other situations. Other anode materials are useful as well. The solid state electrolyte in a solid state lithium ion battery may also come in a variety of different materials, providing mainly for a solid form and for good $Li^+$ ion transport properties. Some early examples might include Lithium Iodide (LiI) and Lithium Phosphorus Oxynitride (LiPON). Solid polymer separators may also be included, such polymers having $Li^+$ transport capacity often due to having a lithium salt disposed therein. Work has also been performed with lithium and halide materials, particularly, in some examples, a lithium aluminum tetrahalide such as lithium aluminum tetrafluoride ($LiAlF_4$). Moreover, though bi-layers of heterogeneous electrolyte materials have also been used, in some cases for differing physical characteristics of the respective layers; dual homogenous layers have not apparently before been considered.

In a more specific example, a number of implementations might involve the use of a lithium and metal oxide such as a nickel oxide (NiO) electrode layer, e.g., a lithiated NiO (Li—NiO) layer (layered oxide), as a cathode in a battery or a counterelectrode in other electronic devices (as for example, a counterelectrode in an electrochromic device, see below). In either of such or other similar solid state thin film electronic devices, a complication can be encountered particularly in preserving the intercalated $Li^+$ ions within the Li—NiO electrode. After deposition of a lithium and NiO layer on a substrate (see e.g., layer 14 on substrate 12), exposure thereof to air will typically allow for the lithium to react with oxygen, i.e. to oxidize the lithium and render the lithium unavailable for ion transport. Such an air exposure may occur at a variety of fabrication phases, as for example, if a mask change is desired after the initial deposition. It has also been found; however, that such an air exposure can occur even after an overlayer of a solid state electrolyte such as a relatively porous lithium-based electrolyte layer (e.g., a porous $LiAlF_4$) has been formed over the electrode layer, and then that overlayer is exposed to air. The oxygen in the air has been found to permeate the porous overlayer and react with the $Li^+$ ions in the underlayer creating a more stable LiO—NiO underlayer having substantially no un-bound $Li^+$ ions available for intercalation or de-intercalation. Thus, if in the example of FIG. 1, before the formation of a second electrode layer 18, the porous electrolyte layer 16 is exposed to air (for mask changing or other reasons), then $O_2$ and/or $H_2O$ therein may permeate through the porous layer 16 and react with the intercalated Li in layer 14.

Note, a relatively porous $LiAlF_4$ electrolyte layer (formed in high vacuum conditions of about $10^{-4}$ torr) has been found to have good lithium ion transport characteristics as a solid state electrolyte, as well as having good structural stability (not susceptible to cracking or shorting). The porosity does, as noted above, however allow oxygen interaction with the lithium in the lithiated electrode layer. On the other hand, a denser, less porous $LiAlF_4$ electrolyte layer (formed in higher vacuum conditions of about $10^{-6}$ torr) has been found useful, particularly in protection of the underlayer lithiated structure from oxygen permeation; however, such a dense electrolyte, has further been found when used alone to not be structurally sound and rather be subject to cracking and thus allow for undesirable electrical shorting therethrough.

Nevertheless, when used in conjunction as shown in the example of FIG. 2, the homogenous layers 15 and 16 provide on the one hand, protection from oxidation of the Li ions in the underlayer 14, as well as good Li transport therethrough during use. The thin dense layer 15 provides the protection from oxygen permeation, and is selected thin enough that it doesn't detract substantially from the ion transport therethrough and maintains a substantial flexibility. The relative density/porosity of the two layers 15, 16 may be established by deposition at different vacuum pressures, a higher vacuum, lower pressure (e.g. on the order of $10^{-6}$ torr) for the dense layer 15, and lower vacuum (though still in the "high vacuum" range), higher pressure (e.g. on the order of $10^{-4}$ torr) for the more porous layer 16. In the example started above, the homogenous electrolyte layers 15, 16 may be both of the same lithium-based electrolyte material, such as a lithium aluminum tetrafluoride ($LiAlF_4$), the first, thinner layer deposited at about $2\times10^{-6}$ torr at a thickness of about 250 Å, while the thicker layer might be deposited at about $6\times10^{-4}$ torr (argon gas) (about 300 times higher pressure) at a thickness of about 7750 Å (ratio of about 30 to 1 relative to the thinner layer). In this example, a similar deposition rate of about 2 Å per second might be used. Thus, the thin layer (approx 250 Å) of dense, $10^{-6}$ torr, $LiAlF_4$ provides a protective $O_2/H_2O$ barrier for the underlying $Li^+$—NiO layer by allowing air exposure during a change to a larger mask, or for other purposes.

Note, a mask change, or other air exposure could then be safely undertaken after either or both of the deposition steps of layers 15, 16. Then, an electrode, or current collector layer 18 could be formed thereover. Note further that a variety of different additional or in some cases substitute layers could be formed on/in device 10 as well, including at least an instance of the homogenous dual layer ionic transport structure over an underlayer to be protected against exposure.

Further, steps of fabrication of thin-film stacks for use in batteries as described above, might be similarly be used in fabrication of other thin film electronic devices incorporating the principles hereof. For example, electrochromic (EC) thin-film stacks might be fabricated in similar fashion. (An example of use of such a structure in EC devices might be as a security measure on polymeric CD's and DVD's for security/theft prevention.) Thin-film solid state electrochromic devices typically use multiple masks to generate a specific EC device design pattern. Changes in masking use periodic venting of the deposition chamber to atmosphere with consequent exposure of the device layers to reactive water vapor and/or oxygen. As described above, a lithiated NiO counterelectrode layer degrades rapidly when exposed to ambient conditions, but the next processing step uses a mask change for the subsequent $LiAlF_4$ electrolyte layer, deposited at a lower vacuum, $10^{-4}$ torr pressure to produce a relatively porous, low tensile stress, crack-free film having good mechanical properties with concomitant fast Li Ion transport properties. Moreover, deposition of a thicker, 1000 nm, protective layer of porous low-vacuum ($10^{-4}$ torr pressure) $LiAlF_4$ over the sensitive lithiated NiO counter electrode prior to the mask change still proves inadequate to preserve the intercalated lithium from deleterious reaction with water vapor and oxygen in the ambient environment.

However, deposition of a thin, dense, high vacuum, $10^{-6}$ torr pressure, layer of $LiAlF_4$ has been found to be beneficial to protecting and preserving the lithium ion content and functionality of the lithiated NiO counterelectrode of the EC device. This thin dense $LiAlF_4$ layer protects the lithiated NiO counterelectrode to allow subsequent exposure to air resulting from a mask change to deposit a thicker layer of the desired low-vacuum porous $LiAlF_4$ having good mechanical and ion-transport properties.

In a more specific example of such an EC device 100, see FIG. 4, where a polymer substrate 120 is shown having an indium doped tin oxide (ITO) coated glass layer 130 deposited thereon as might be understood in the field of EC device use and fabrication. An NiO layer 142 is deposited thereover, with a thin layer of lithium 144 further deposited thereon. The lithium ions of layer 144 become intercalated within the NiO layer 142 as understood in layered oxide practice to form the counterelectrode layer 140. For example, lithium metal may be evaporated onto the NiO layer 142 and subsequently diffuse into that layer as $Li^+$ ions as depicted by the cross-hatched layer 144 to form the counterelectrode layer 140. Then, a first thin film 150 of an electrolyte material, e.g., $LiAlF_4$, is deposited thereon with a second layer 160 of the same material, e.g., $LiAlF_4$, with different characteristics (e.g., more porous, less dense) formed thereover. As above, the parameters of the second $LiAlF_4$ deposition may have been changed over that used to generate the lithiated NiO underlayer and the first $LiAlF_4$ deposition. In an example, the ITO 130, the NiO 142, the Lithium 144, and the first $LiAlF_4$ deposition 150 may have all been deposited at or about the same pressure, e.g. on the order of $10^{-6}$ torr, in another example all at high vacuum, $2\times10^{-6}$ torr. The second $LiAlF_4$ may be deposited at about $10^{-4}$ torr, in a particular example, at $6\times10^{-4}$ torr with the pressure maintained in the vacuum deposition system by an argon gas leak, to provide an $LiAlF_4$ layer that is porous, and as established above, has superior $Li^+$ ion transport properties and importantly does not exhibit cracks which may short and destroy the EC device. Also as above, the $10^{-6}$ torr dense $LiAlF_4$ layer provides a barrier against $O_2$ permeation, and when used with a thick porous layer 160, may not exhibit cracking and shorting. As a result, a second layer of porous, $10^{-4}$ torr, low tensile stress, crack-retardant $LiAlF_4$ may provide for better Li+ transport properties in combination with the thin dense layer of $LiAlF_4$ electrolyte shielding the Li+-NiO sub-layer, thereby allowing exposure to the environment. Note, the two work synergistically together, such that the thicker, subsequent, porous $LiAlF_4$ electrolyte may be used for its better stress-relieved $Li^+$ transport properties, which appears to aid in not allowing cracking of the thin, dense layer. This dual homogenous $LiAlF_4$ layer allows successful fabrication of an EC device.

As introduced above, other layers may also be formed, as with the additional three overlayers shown in FIG. 4. A first such layer 180 is a tungsten oxide-based electrochromic material ($WO_3$), with another layer of ITO 190 formed thereover, finished with a silicon oxide layer 200 (SiO). Other and/or substitute layers may be used herein as well. In a particular example, working pressures for deposition of these layers may be on the order of about $10^{-6}$ torr, and in one instance, at $2\times10^{-6}$ torr. A further alternative example has the $WO_3$ and SiO deposited at about $2\times10^{-5}$ torr, with appropriate gas leaks to maintain the pressure within the vacuum system and in some cases to supply reactive gases to form the desired compound.

In a particular example of an EC device 100 hereof, the first two layers 130, 142 may have been deposited to relative thicknesses of about 60 nm and about 120 nm, respectively, in time periods of about 11 minutes and about 30 minutes respectively. The Li layer 144 may have been laid down at about 0.4 Å/s to an equivalent amount to equal a thickness of about 154 Å, followed by the first $LiAlF_4$ layer 150 deposited to a thickness of about 250 Å at a rate of deposition of about 2 Å/s, all of these steps occurring at about $2\times10^{-6}$ torr. Then, at the lower vacuum of about $6\times10^{-4}$ torr (Ar leak), the second $LiAlF_4$ layer 160 may have been formed to a thickness of about 7750 Å at a rate of about 2 Å/s. Then, at a higher vacuum, e.g., about $2\times10^{-5}$ torr ($H_2O$ leak), the $WO_3$ 180 may have been formed to a depth of about 3500 Å at a rate of about 5 Å/s. The second ITO layer 190 may be about the same as the first at about 60 nm deposited at about $2\times10^{-6}$ torr over an about 11 minute period. About 2000 Å of the SiO layer 200 may have been deposited at about $2\times10^{-5}$ torr, at a rate of about 3 Å/s. The net result is the formation of a novel, dual-layer, thin-dense/thick-porous homogenous $LiAlF_4$ electrolyte on the order of about 1000 nm (here about 800 nm) with a dense to porous layer thickness ratio of approximately 1 to 30 which enables successful fabrication of a durable, functional, multi-layer EC device on a polymer substrate. A successful EC device was fabricated according to the preceding Example.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A solid state thin film electrochemical device comprising:
   at least one electrode; and,
   an electrolyte deposited on the electrode, the electrolyte including at least two homogenous layers of discrete properties, the two homogenous layers comprising a first dense layer and a second porous layer.

2. A solid state thin film electrochemical device according to claim 1 wherein one or both of: the first dense layer provides a substantial barrier to one or both of oxygen and water and the second porous layer provides substantial mechanical stability, while both layers are good ion conductors.

3. A solid state thin film electrochemical device according to claim 1 further comprising one or more of: a substrate, a second electrode layer, one or more current collectors, and one or more electrochromic layers.

4. A solid state thin film electrochemical device according to claim 1 wherein the electrolyte is lithium ion conductive.

5. A solid state thin film electrochemical device according to claim 1 wherein the electrode is lithium ion reactive.

6. A solid state thin film electrochemical device according to claim 1 wherein one or both the electrodes is a lithiated electrode and the electrolyte is lithium-based.

7. A solid state thin film electrochemical device according to claim 1 wherein the electrode includes one or more of a lithiated metal oxide, lithium cobalt oxide ($LiCoO_2$), lithium manganese oxide ($LiMnO_2$ or $LiMn_2O_4$), lithium nickel oxide (LiNiO), a spinel or a composite of two or more of cobalt, manganese or nickel, or a lithiated metal phosphate, or lithium iron phosphate ($LiFePO_4$).

8. A solid state thin film electrochemical device according to claim 1 wherein the electrolyte is a solid state electrolyte including one or more of lithium iodide (LiI), lithium phosphorus oxynitride (LiPON), a solid polymer separator having $Li^+$ transport capacity, a solid polymer separator having a lithium salt disposed therein, a lithium and halide composite material, a lithium aluminum tetrahalide, and a lithium aluminum tetrafluoride ($LiAlF_4$).

9. A solid state thin film electrochemical device according to claim 1 wherein the electrode includes one or more of a lithium metal, graphite, certain metal oxides, or another carbon based form.

10. A solid state thin film electrochemical device according to claim 1 further comprising a second electrode including one or more of a lithium metal, graphite, metal oxides, or another carbon based form.

11. A solid state thin film electrochemical device according to claim 1 which is or is part of one or more of a thin film battery, a lithium ion battery, or an electrochromic device.

12. A solid state thin film electrochemical device according to claim 1 in which the two homogenous layers of discrete physical properties are formed using discrete manufacturing characteristics.

13. A solid state thin film electrochemical device according to claim 1 in which the two homogenous layers of discrete physical properties are formed using discrete manufacturing characteristics including one or more of different temperatures, pressures, speed, deposition rates, concentrations or discrete atmospheric conditions.

14. A solid state thin film electrochemical device according to claim 1 in which the first dense layer and a second porous layer are formed in high vacuum, the first dense layer at one low pressure to form a more dense, less permeable layer and a second lower vacuum, higher pressure to form the second relatively porous layer.

15. A solid state thin film electrochemical device according to claim 1 in which the first dense layer and a second porous layer are formed in high vacuum, the first dense layer at one low pressure to form a more dense, less permeable layer and a second lower vacuum, higher pressure to form the second relatively porous layer where the second lower vacuum pressure is about 100 times higher pressure.

16. A solid state thin film electrochemical device according to claim 1 wherein the at least two homogenous layers comprise a first thin, dense layer and a second thick, porous layer.

17. A method of making a solid state thin film electrochemical device comprising:
    depositing an electrode on a supporting material; and,
    depositing an electrolyte on the electrode, wherein the electrolyte deposition process includes deposition of at least two homogenous layers of electrolyte of discrete physical properties, the two homogenous layers comprising a first dense layer and a second porous layer.

18. A method according to claim 17 wherein the discrete properties are made by varying one or more manufacturing characteristics including one or more of varied temperatures, pressures, speeds, deposition rates, concentrations or discrete atmospheric conditions.

19. A method for forming a solid state thin film electrochemical device including an electrode and an electrolyte, the method comprising:
    forming an electrode layer,
    forming a first electrolyte layer, and
    forming a second electrolyte layer, wherein the first and second electrolyte layers are two discrete but chemically homogenous layers comprising a first dense layer and a second porous layer.

20. A method according to claim 19 wherein the first electrolyte layer is formed on the electrode layer by thin film deposition, and the second electrolyte layer is formed on the first electrolyte layer by thin film deposition at a different manufacturing condition.

* * * * *